US006917871B2

(12) United States Patent
Jumonji et al.

(10) Patent No.: US 6,917,871 B2

(45) Date of Patent: Jul. 12, 2005

(54) CAR CONTROL UNIT

(75) Inventors: Kentaro Jumonji, Hitachinaka (JP); Hayato Sugawara, Hitachinaka (JP)

(73) Assignees: Hitachi, Ltd., Tokyo (JP); Hitachi Car Engineering Co., Ltd., Hitachinaka (JP)

( * ) Notice: Subject to any disclaimer, the term of this patent is extended or adjusted under 35 U.S.C. 154(b) by 0 days.

(21) Appl. No.: 10/670,252

(22) Filed: Sep. 26, 2003

(65) Prior Publication Data

US 2004/0118378 A1 Jun. 24, 2004

(30) Foreign Application Priority Data

Sep. 27, 2002 (JP) ...................................... 2002-282144

(51) Int. Cl.[7] ................................................ B60T 8/32

(52) U.S. Cl. ....................................................... 701/93

(58) Field of Search .............................. 701/81, 89, 93

(56) References Cited

U.S. PATENT DOCUMENTS 5,897,596 A 4/1999 Kabune et al.
6,088,631 A 7/2000 Kuehn et al.
6,157,175 A 12/2000 Morinigo et al.
2002/0023242 A1 * 2/2002 Kidokoro et al. ............. 714/37
2002/0073962 A1 6/2002 Tomita et al.
2002/0105769 A1 8/2002 Sato et al.

FOREIGN PATENT DOCUMENTS

JP 10-307635 11/1998
JP 2001-267381 9/2001

OTHER PUBLICATIONS

European Search Report mailed Feb. 13, 2004.

* cited by examiner

*Primary Examiner*—Yonel Beaulieu
(74) *Attorney, Agent, or Firm*—Crowell & Moring LLP

(57) ABSTRACT

A power source control method of a car control unit in which control takes place according to the control unit temperature or the control of a semiconductor device in the control unit.

The temperature of a throttle device is detected using a thermistor and is compared with the reference temperature. Depending on the comparison result, a relay for controlling the power supply to the throttle device is controlled.

When the temperature of the throttle control unit rises higher than the reference temperature, the main power source of the throttle device 1 is interrupted.

13 Claims, 13 Drawing Sheets

*FIG. 15* *PRIOR ART*
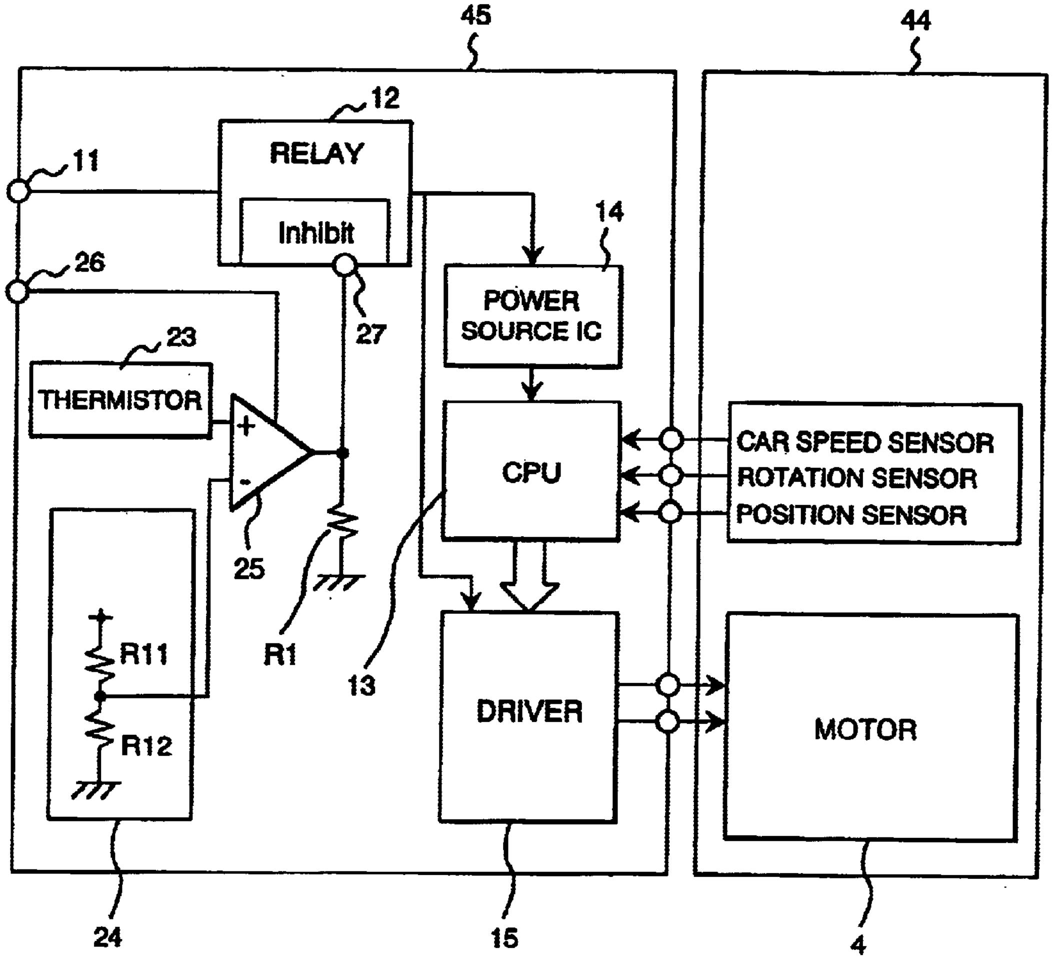

CAR CONTROL UNIT

BACKGROUND OF THE INVENTION

Generally, an engine control unit of a car is installed in a location away from the engine such as a car room where persons get in or a freight location. An automatic speed regulator control unit of a car is similarly installed in a location away from the automatic speed regulator. A control unit installed in this way is operated at the intra-car-room temperature and atmospheric temperature.

In recent years, from the viewpoint of reduction of the harness to be used inside a car and space reservation in a car room, such a control unit is apt to be installed in a control object itself or in the neighborhood of the control object. In such an installation location, for example, an engine control unit or a throttle control unit which is a control unit directly arranged in the engine, when the engine is in operation, is cooled by the flow of air or circulation of cooling water. Further, an automatic speed regulator control unit directly arranged in an automatic speed regulator, when the engine is in operation, is cooled by circulating gear oil for lubricating the speed change gear. Furthermore, a control unit installed integrally with a gear case for switching two-wheel drive and four-wheel drive of a car, in the same way as with the automatic speed regulator control unit, is cooled by circulating gear oil.

However, when the engine is stopped once, the circulation of cooling water is stopped and the cooling function is lost, so that the aforementioned control units rise in temperature once higher than that during operation of the engine and then is naturally cooled. A recent control unit is installed in the neighborhood of a control object as mentioned above and used in a severe state, thus a semiconductor integrated circuit and a semiconductor device used in a control unit are used at the semiconductor operation guarantee limited temperature (125° C. as a standard) at the highest.

In other fields of a computer system and a semiconductor manufacturing device, control units for protecting an object of a computer system or a semiconductor manufacturing device from abnormal heating when a temperature error occurs are indicated below.

[Patent Document 1]

Japanese Application Patent Laid-open Publication No. Hei 10-307635.

[Patent Document 2]

Japanese Application Patent Laid-open Publication No. 2001-267381.

SUMMARY OF THE INVENTION

In the above prior arts, it is not taken into account that for example, when the engine is stopped and then operated again, no sufficient cooling effect is obtained, thus the semiconductor integrated circuit and semiconductor device are operated at a higher temperature than the operation guarantee temperature and hence, a problem arises that the operation of the control unit cannot be guaranteed.

Further, in the above patent applications, the aforementioned use environment of the control unit in a car is not taken into account.

An object of the present invention is to provide, when the temperature of a semiconductor device used in a control unit is beyond the semiconductor operation guarantee temperature range, the operation guarantee of the control unit and additionally the safety insurance of a car by putting the control unit into a non-operation state.

To solve the above problem, the main power source of a car control unit is controlled by a temperature detection unit (for example, a temperature sensor) for detecting the temperature of the car control unit, a setting unit for setting a reference temperature for comparison with the detected temperature, and a comparison output means for comparing the detected temperature with the reference temperature and outputting a control signal (for example, an over-temperature signal to be output when the detected temperature is higher than the reference temperature) according to the comparison result.

BRIEF DESCRIPTION OF THE DRAWINGS

FIG. 15 is a block diagram of a conventional car drive system and two-wheel drive and four-wheel drive switching device.

DESCRIPTION OF THE PREFERRED EMBODIMENTS

The present invention controls the main power source of a car control unit by a temperature detection unit (for example, a temperature sensor) for detecting the temperature of the car control unit, a setting unit for setting a reference temperature for comparison with the detected temperature, a comparison means for comparing the detected temperature with the reference temperature, and an output means for outputting a control signal (for example, an over-temperature signal to be output when the detected temperature is higher than the reference temperature) according to the comparison result. The comparison means and the output means may be united to a comparison and output means.

For example, to control the main power source, a power unit having a relay is used. As a temperature detection means, for example, a temperature resistor thermistor whose resistance varies with the temperature is used. As a reference temperature setting means, for example, a voltage divider circuit using a resistor is used and as a comparison unit, for example, a comparator is used. Further, the detected temperature and reference temperature are input to the comparator and when the detected temperature is higher than the reference temperature, the comparator output goes high or low. The comparator output is used as a control signal of power supply of the control unit for the power unit and when the temperature of the control unit is beyond the operation guarantee temperature range, can put the control unit into the non-operation state, thereby can guarantee the operation of the control unit.

The inventors examined the conventional various problems. The embodiments thereof will be explained below with reference to the accompanying drawings.

Figure 1:
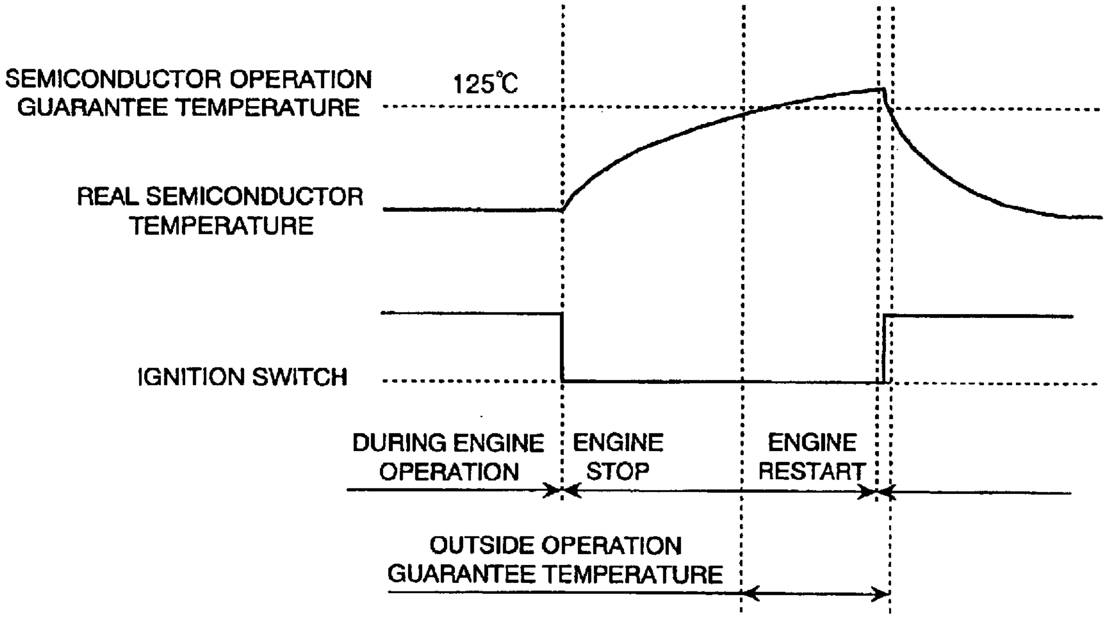
FIG. 1 is a temperature drawing of a car control unit before and after engine stop.
Figure 2:
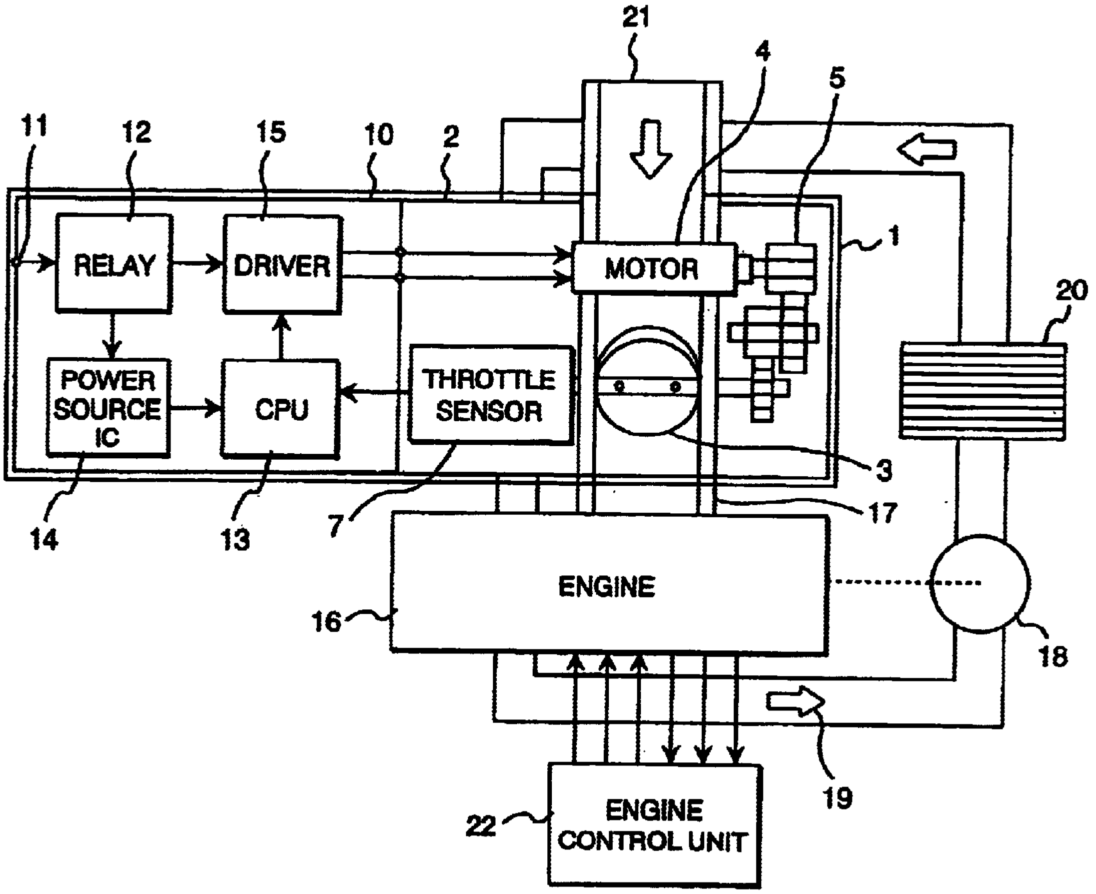
FIG. 2 PRIOR ART
FIG. 2 is a drawing of a control unit for a conventional engine intake system and throttle integrally installed.

The first embodiment relates to a throttle control unit for controlling the air flow rate sucked in an engine of a car. FIG. 1 is a drawing showing the relationship between the temperature of a conventional car control unit and before and after stopping of the engine operation. FIG. 2 is a-block diagram of a general engine intake system and a control unit integral with the throttle body.

Figure 3:
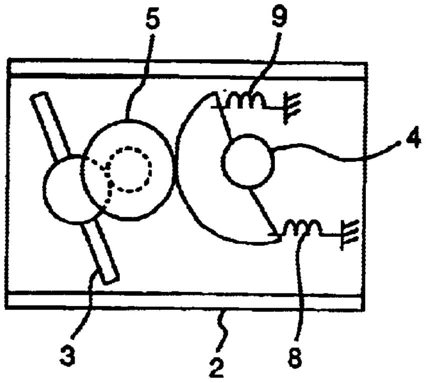
FIG. 3 is a cross sectional view of a throttle body.

In a throttle body 2 for controlling the air flow rate to be sucked in the engine in a control unit 1 integral with the throttle body (hereinafter referred to as a throttle device), a throttle valve 3, a motor 4 for driving the throttle valve 3, an intermediate gear 5 for decelerating the motor output and transferring the power to the throttle valve 3, and a throttle default stopper mechanism 6 for holding the throttle valve 3 at a fixed aperture even when the throttle valve 3 is not controlled, that is, even when no power is supplied to the throttle device 1 are arranged and additionally a throttle sensor 7 for detecting the throttle aperture is arranged. FIG. 3 is a cross sectional view of the throttle body and the throttle default stopper mechanism 6 is structured so as to use two springs. Namely, for example, when a throttle valve aperture of 10° is set as a throttle default value, the two springs are arranged as a spring 8 in the throttle valve opening direction and a spring 9 in the throttle valve closing direction and the strength of the two springs is set so as to control the throttle valve aperture to 10°. In the throttle device, a throttle control unit 10 with a control semiconductor arranged is installed and in the throttle control unit, a battery terminal 11 for connecting the battery power source, a relay 12 for controlling the power supply, a throttle control CPU 13, a power source IC 14 for supplying the power of the CPU 13, and a driver 15 for operating the motor 4 are arranged. The aperture of the throttle valve 3 is decided by controlling the driver 15 to the instruction aperture outputted by communication from the engine control unit 22 by the CPU 13.

The throttle control unit 10 is attached to an intake pipe 17 of an engine 16 in a state integral with the throttle body 2, so that the throttle device 1 is installed in a location, when the engine 16 is in operation, easily heated by heat generated in the engine 16 via the intake pipe 17. Generally, the engine 16 uses a water pump 18 in synchronization with the engine 16, circulates cooling water 19 inside the engine, and is cooled by a radiator 20 for radiating the cooling water heat to the air so as to avoid an overheating state and furthermore the air flow rate passing through the intake pipe 17 is synchronized with the engine 16, so that by the same action as that of the cooling water 19, the throttle device 1 is cooled by intake air 21 sucked in the engine 16. In the same way as with the engine 16, the cooling water 19 circulating inside the throttle body 2, in addition to the cooling action to the throttle device 1, circulates so as to prevent the throttle valve 3 from freezing at a low temperature. Further, the engine control unit 22 is installed in a location hardly affected by heat generated by the engine 16, for example, in a car room.

In this case, when the operation of the engine 16 is stopped, the water pump 18 in synchronization with the engine 16 is also stopped, so that the cooling water 19 does not circulate in the engine 16, and the cooling action to the engine 16 is lost, and the engine 16 rises in temperature for 10 minutes to 30 minutes and then lowers. Also in the throttle device 1 connected to the intake pipe 17 as mentioned above, similarly the cooling water 19 does not circulate, and the intake air 21 is not sucked in the engine 16, so that the throttle device 1 is not cooled and heated by heat transferred from the engine 16 via the intake pipe 17. The temperature of the heated throttle device 1, for example, when the engine 16 is stopped immediately after running on an expressway, as shown in FIG. 1, rises up to 130° C. together with the engine temperature immediately after engine stop. When the throttle device 1 is operated in this state, since the throttle control unit 10 is installed in the throttle device 1, the temperature of the semiconductor such as the throttle control CPU in the control unit rises beyond the operation guarantee temperature range because the highest operation guarantee temperature of the semiconductor is generally 125° C. As a result, it is found that the operation of the throttle device 1 cannot be guaranteed.

Figure 4:
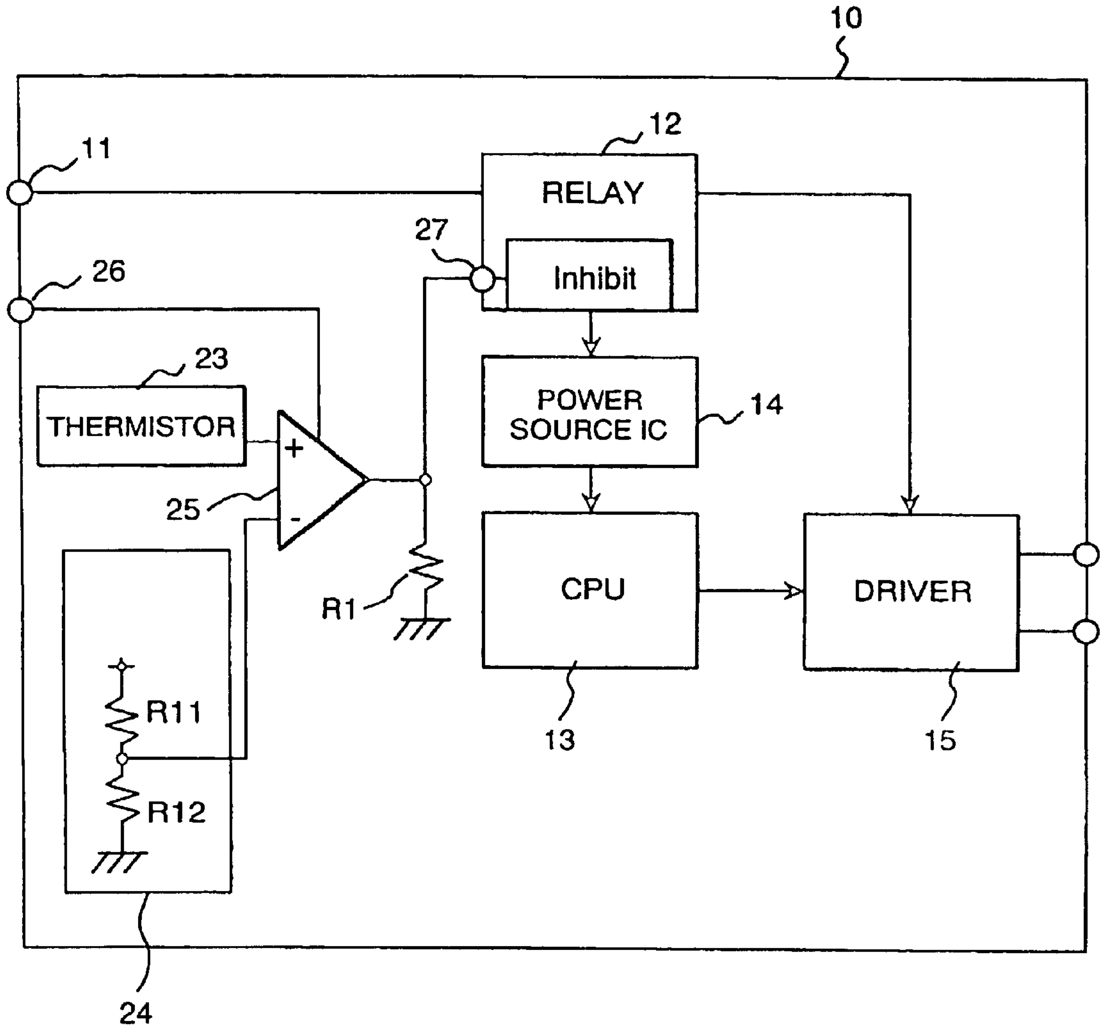
FIG. 4 is a block diagram of the first throttle control unit of this embodiment.

The first embodiment for solving the above problem will be explained in detail below by referring to FIG. 4. FIG. 4 is a block diagram of the throttle control unit 10 showing the embodiment and in a conventional throttle control unit, a means for detecting the temperature of the throttle control unit 10, for example, a thermistor 23 like a temperature resistor, a comparator 25 for comparing the detected temperature with a reference temperature 24 using a voltage divider circuit by resistors R11 and R12, additionally an ignition terminal 26 for detecting an engine start instruction, and a relay Inhibit terminal 27 for controlling the operation and non-operation of the relay 12 for connecting the comparison result of the comparator 25, that is, the output of the comparator 25 are provided. The relay may be composed of a semiconductor such as an FET or a mechanical relay such as a relay internally having a coil and a switch and when an input signal to the relay Inhibit terminal 27 is high, the relay operates and when it is low, the relay does not operate.

The ignition terminal 26 functions as a power source for the comparator 25 and the reference temperature 24, that is, when the engine 16 is stopped and then restarted, the comparator 25 is operated, thus the ignition terminal 26 detects the engine start instruction.

At the questionable restart time of the engine 16 or at the start time of the engine, a signal (power) to the ignition terminal 26 is input, so that the comparator 25 starts operation first in the throttle control unit 10. Further, the power is also supplied to the battery terminal 11, and the relay Inhibit terminal 27 is in the non-operation state because it is pulled down by the resistor RI, and the throttle control unit 10 does not operate. The output of the thermistor 23 for detecting the temperature of the throttle control unit 10 and the output of the reference temperature 24 as a temperature comparison value are input to the comparator 25. At this time, the comparator 25 compares the reference temperature 24 with the output of the thermistor 23 and outputs the comparison result. The output is input to the relay Inhibit terminal 27, and when the output of the thermistor 23 is lower than the reference temperature 24, the output of the comparator 25 goes high, and the relay 12 operates, while when the output of the thermistor 23 is inversely higher than the reference temperature 24, the output of the comparator 25 goes low, and the relay 12 is put into the non-operation state. When the relay 12 is in the non-operation state, the throttle control unit 10 does not operate. However, the engine control unit 22 has a different constitution from the throttle control unit 10, and the engine 16 starts operation, and the water pump 18 in synchronization with the engine 16 operates, and the throttle device 1 is cooled by the cooling water 19 circulating by the water pump 18, and furthermore even when the throttle device 1 is not operated, the throttle valve 3 is opened at a fixed aperture by the throttle default stopper mechanism 6, so that the throttle device 1 is cooled by the intake air 21 sucked in the engine 16. When the temperature of the throttle control unit 10 lowers than the reference temperature 24, the output of the comparator 25 goes high, and the relay 12 operates, and the throttle control unit 10 starts operation. According to this embodiment, when the temperature of the throttle control unit 10 is higher than the reference temperature 24, the relay 12 of the throttle control unit 10 interrupts the main power source and an effect of prevention of malfunctions of the throttle control unit 10 can be produced.

Figure 5:
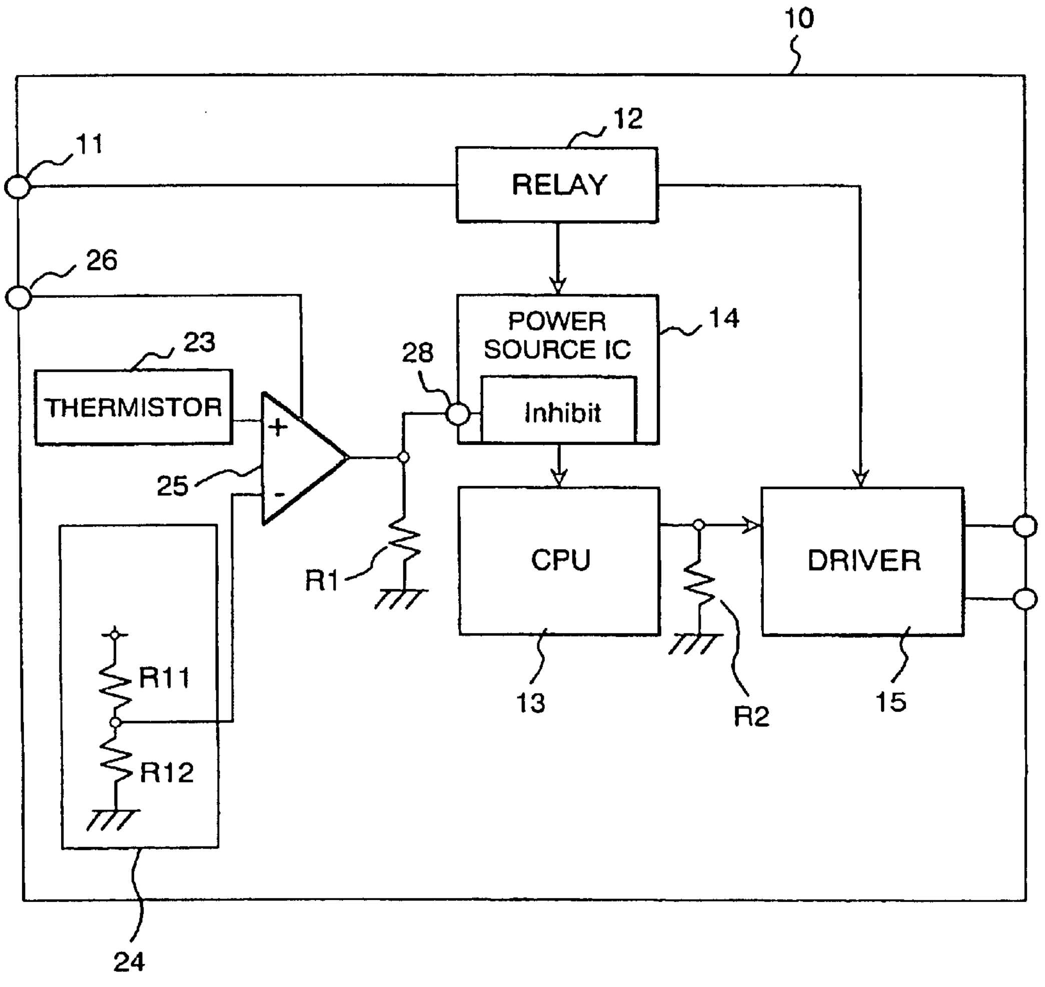
FIG. 5 is a block diagram of the second throttle control unit of this embodiment.

The second embodiment will be explained in detail by referring to FIG. 5. The second embodiment, in place of the relay Inhibit terminal 27 in the first embodiment, has a power source IC Inhibit terminal 28 and additionally has a pull-down resistor R2 on the line connecting the output of the CPU 13 to the input terminal of the driver 15. The power source IC Inhibit terminal 28 controls the operation and non-operation of the power source IC 14, and for example, when the input of the power source IC Inhibit terminal 28 is high, the power source IC 14 operates and when the input is low, the power IC 14 is put into the non-operation state. In the same way as with the first embodiment, at the start time and restart time of the engine, the ignition switch is turned on and power is supplied to the ignition terminal 26. The comparator 25 starts operation first in the throttle control unit 10, and the comparator 25 starting operation compares the output of the thermistor 23 for detecting the temperature of the throttle control unit 10 with the reference temperature 24 and inputs the comparison result to the power source IC Inhibit terminal 28. When the output of the thermistor 23 is lower than the reference temperature 24 in the same way as with the first embodiment, the output of the comparator 25 goes high, and the power source IC 14 operates, and when the output of the thermistor 23 is higher than the reference temperature 24, the output of the comparator 25 goes low, and the power source IC 14 is put into the non-operation state. Further, power is also supplied to the battery terminal 11 simultaneously with the ignition switch, so that power is supplied to the driver 15 via the relay 12 and the driver 15, when an input signal is input, enters the operable state. Namely, by the input condition of the driver 15, the operation of the throttle valve 3 can be set. In the first embodiment, even in the state under no throttle control, the throttle valve 3 is opened at a fixed aperture by the throttle default stopper mechanism 6. However, for example, so as to always make the throttle valve 3 totally closed, the input condition of the driver 15 is set. For example, if the throttle valve 3 is assumed to operate in the direction of totally closing when the input signal of the driver 15 is low and if the throttle valve 3 is assumed to operate in the direction of totally opening when the input signal of the driver 15 is high, since the input signal is pulled down by the pull-down resistor R2 in this embodiment, the throttle valve 3 is operated in the direction of totally closing by the driver 15. Namely, the throttle valve 3 can be operated intentionally in the direction of totally closing and according to this embodiment, when the temperature of the throttle control unit is higher than the reference temperature 24, air to be sucked in the engine 16 can be interrupted and an effect of prevention of a runaway of a car can be produced.

Figure 6:
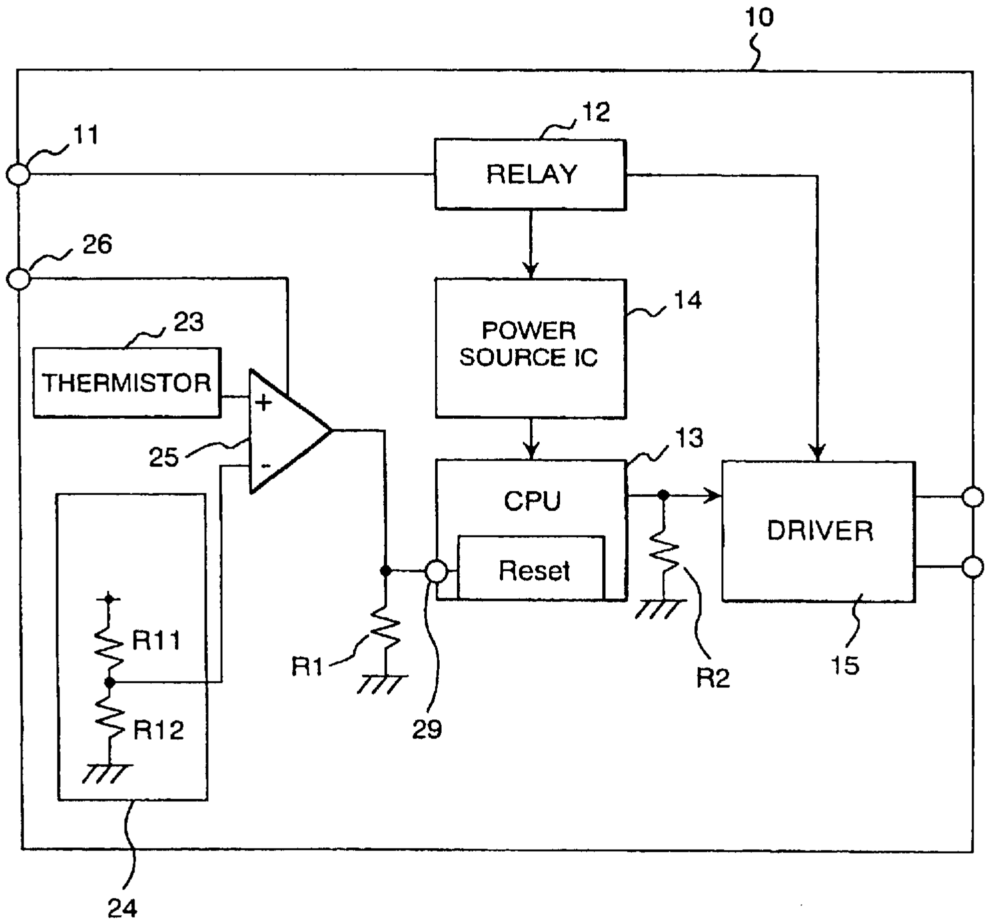
FIG. 6 is a block diagram of the third throttle control unit of this embodiment.

The third embodiment will be explained by referring to FIG. 6. This embodiment, in place of the relay Inhibit terminal 27 in the first embodiment, has a CPU Reset terminal 29. The CPU Reset terminal 29 controls resetting of the CPU 13. For example, when the input of the CPU Reset terminal is high, the CPU 13 is in the general operation state and when the input is low, the CPU 13 is in the reset state. In the same way as with the first and second embodiments, the temperature of the control unit is detected by the thermistor 23 and the detected temperature and reference temperature 24 are compared by the comparator 25. When the output of the thermistor 23 is lower than the reference temperature 24, the output of the comparator 25 goes high and the CPU 13 operates, while when the output of the thermistor 23 is higher than the reference temperature 24, the output of the comparator 25 goes low and the CPU 13 is put into the reset state. When the CPU 13 enters the reset state, the state of the input-output terminal of the CPU 13 varies with the CPU kind, so that for example, in the same way as with the second embodiment, the pull-down resistor R2 is connected to the input of the driver 15. Namely, when the CPU 13 enters the reset state and the terminal of the CPU 13 connected to the driver 15 is set to input, the input of the driver 15 has high impedance and there are possibilities that the driver 15 may perform an unexpected operation. Therefore, the pull-down resistor R2 is connected to the driver 15 and in the same way as with the second embodiment, the throttle valve 3 is operated in the direction of totally closing. According to this embodiment, the same effects as those of the second embodiment can be obtained.

Figure 7:
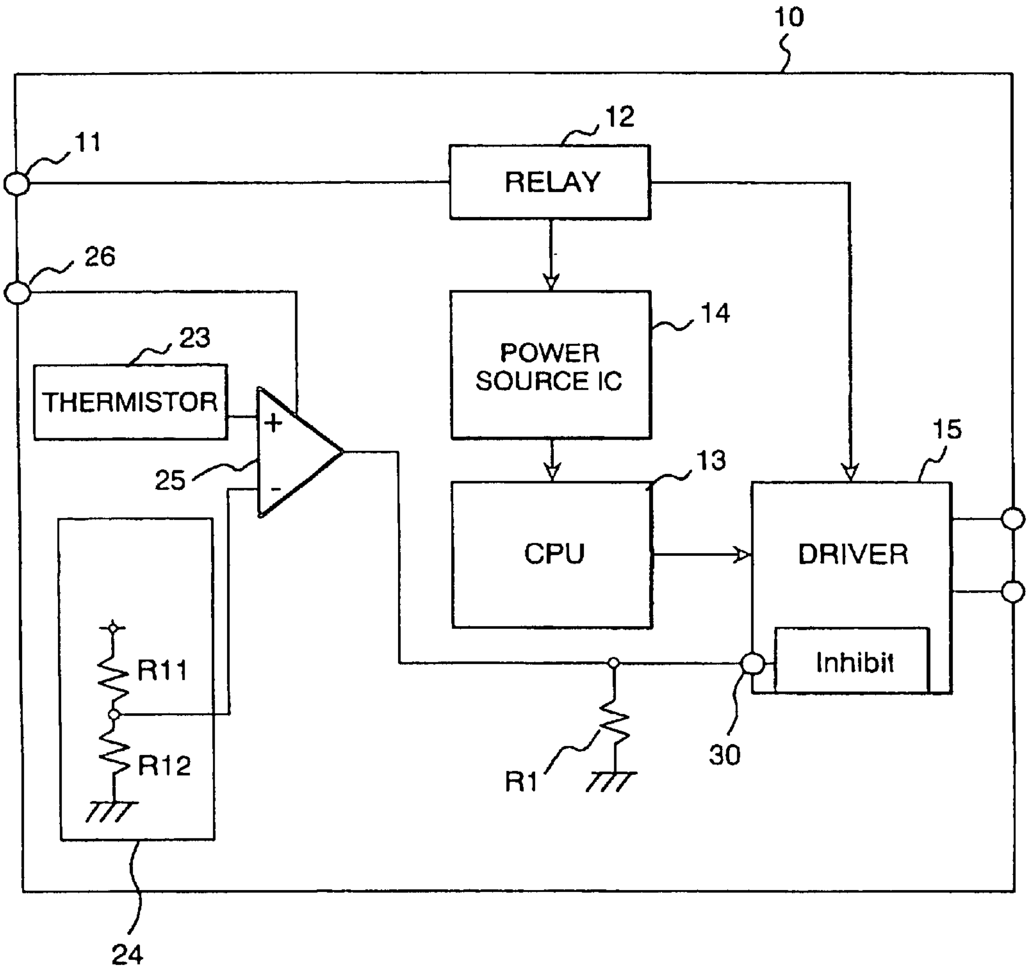
FIG. 7 is a block diagram of the fourth throttle control unit of this embodiment.

The fourth embodiment will be explained by referring to FIG. 7. This embodiment, in place of the relay Inhibit terminal 27 in the first embodiment, has a driver Inhibit terminal 30. The driver Inhibit terminal 30 controls operation and non-operation of the driver 15. For example, when the input of the driver Inhibit terminal 30 is high, the driver 15 is in the operation state and when the input is low, the driver 15 is in the non-operation state. In the same way as with the first to third embodiments, the detected temperature of the control unit and the reference temperature 24 are compared by the comparator 25 and the output of the comparator is input to the driver Inhibit terminal 30. The output of the comparator 25 is decided from the detected temperature and the reference temperature 24 and operation and non-operation of the driver 15 can be controlled by the temperature of the throttle control unit 10. In this embodiment, the output of the comparator 25 is connected only to the driver 15 and power is supplied to the relay 12 of the throttle control unit 10, the CPU 13, and the power source IC 14, so that the units other than the driver 15 can operate. When the operation guarantee temperature of the other semiconductor devices is higher than the operation guarantee temperature of the driver 15, that is, the reference temperature 24, the CPU 13 and the power source IC 14 can operate, so that the throttle valve 3 is in an inoperable state and the fail safe monitoring of the throttle control unit 10 can be performed. According to this embodiment, the throttle valve malfunction prevention effect and throttle control unit monitoring effect can be obtained.

According to the first to fourth embodiments, as described above, in the intake pipe 17 of the engine 16 or the throttle device 1 installed in the neighborhood of the engine 16, when the temperature of a semiconductor device installed in the throttle device 1 becomes beyond the operation guarantee temperature range of the semiconductor, the main power source of the throttle device 1 is interrupted, and the throttle device 1 is prevented from malfunctions, thus the safety of a car can be improved.

Figure 8:
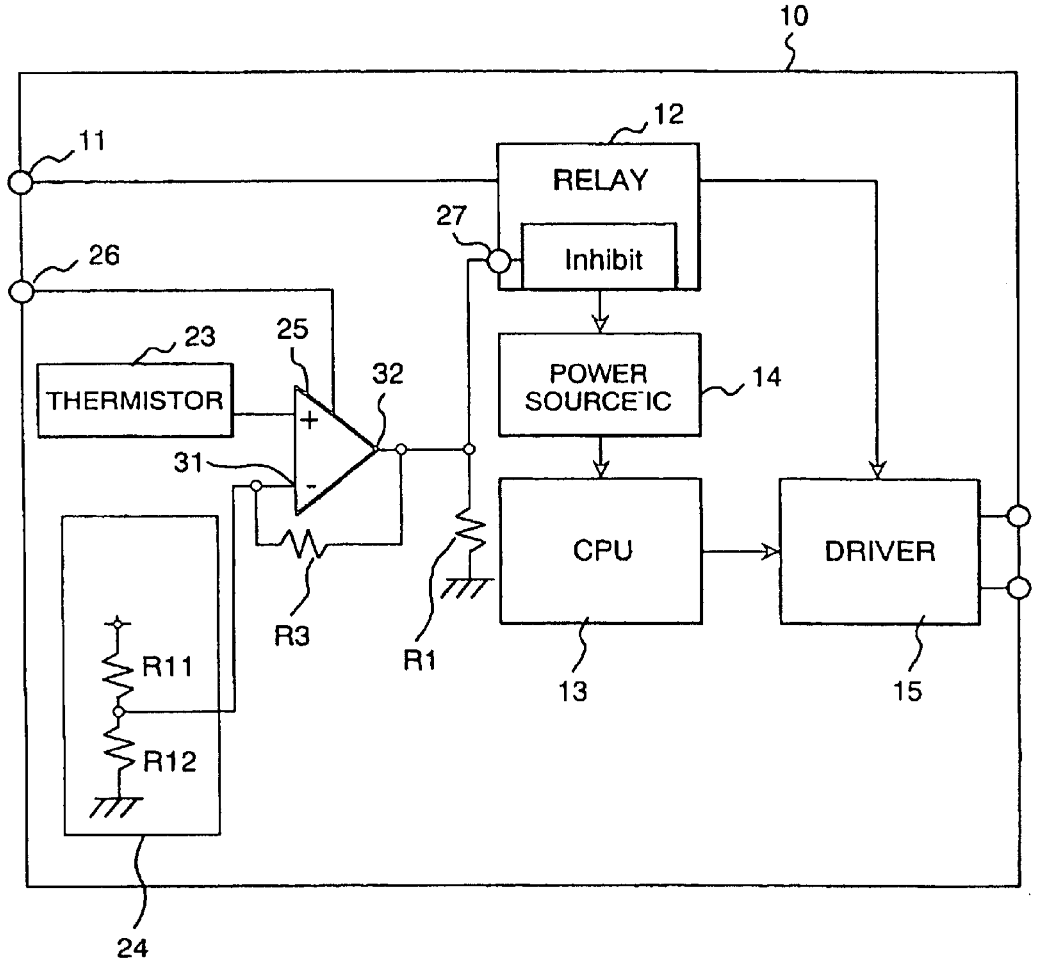
FIG. 8 is a block diagram of the fifth throttle control unit of this embodiment.
Figure 9:
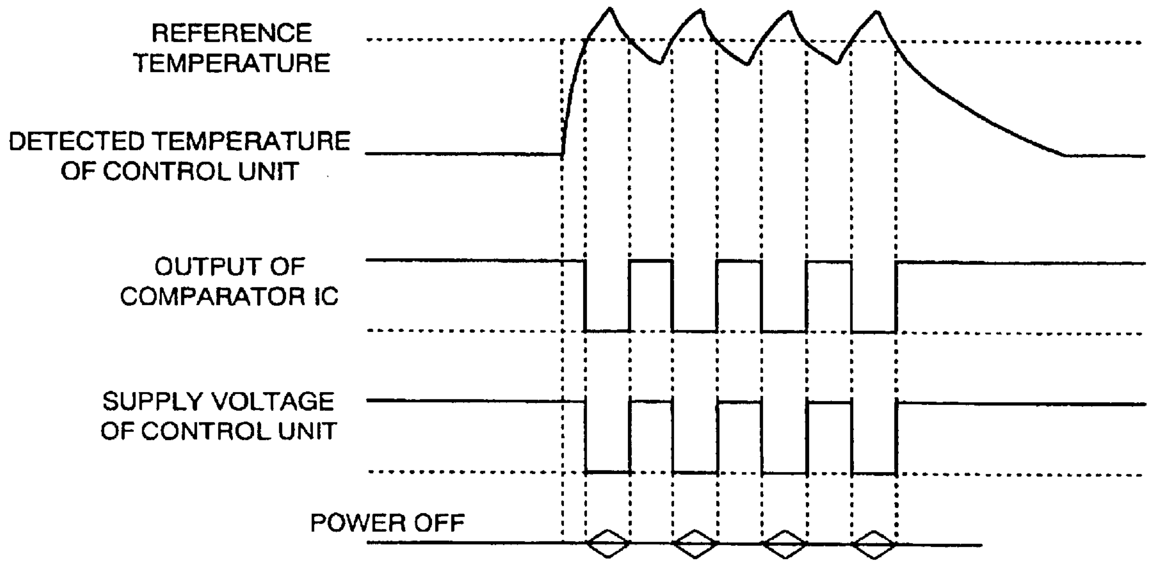
FIG. 9 is a temperature drawing of the first to fourth throttle control units of this embodiment.
Figure 10:
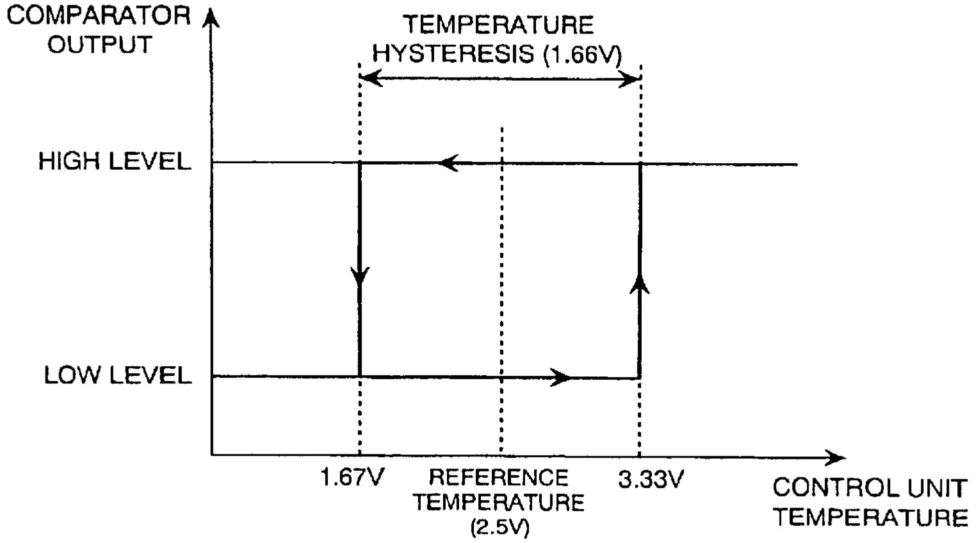
FIG. 10 is a drawing of the fifth throttle control unit temperature and comparator output of this embodiment.

The fifth embodiment will be explained by referring to FIGS. 8 and 9. This embodiment has a resistor R3 to connect an input terminal 31 and an output terminal 32 of the comparator 25 indicated in the first to fourth embodiments. FIG. 9 shows the relationship between the reference temperature 24, the detected temperature of the throttle control unit 10, the output of the comparator 25, and the supply voltage of the throttle control unit 10. When the detected temperature is lower than the reference temperature 24, the output of the comparator 25 goes high and when the detected temperature becomes higher than the reference temperature 24, the output of the comparator 25 changes to low. In the first to fourth embodiments, as shown in FIG. 9, when the detected temperature changes across the reference temperature 24, the output of the comparator 25 goes high or low repeatedly. For example, in the first embodiment, if the equipment is keyed on when the temperature of the throttle control unit is higher than the reference temperature, the throttle control unit intends to start operation. However, since the output of the comparator 25 goes low from the temperature comparison result, the relay 12 of the throttle control unit 10 is interrupted immediately after it, and the throttle control unit is stopped, and when the detected temperature lowers again than the reference temperature 24, the relay 12 of the throttle control unit 10 operates again, so that the throttle control unit restarts to control the throttle valve 3. When the detected temperature is changed in the neighborhood of the reference temperature 24, as mentioned above, control start and control stop of the throttle valve are repeated and the throttle valve 3 enters the hunting operation state. Accordingly, a hysteresis width is given to the reference temperature 24, thus the hunting operation can be avoided. For example, in the first embodiment, when R1 is made equal to R12 and moreover the ignition switch voltage is set to 5 V, the input terminal voltage of the comparator 25, that is, the reference temperature 24 is set to 2.5 V. In this embodiment, the input terminal 31 and the output terminal 32 of the comparator 25 are connected by the resistor R3, so that for example, when R11=R12=R3, and the ignition switch voltage is 5 V, and the voltage of the output terminal 32 is high (5 V), that is, the detected temperature is lower than the reference temperature 24, the reference temperature becomes 5 V*R12/((R11//R3)+R12)=3.33 V, while when the voltage of the output terminal 32 is low (0 V), that is, the detected temperature is higher than the reference temperature 24, the reference temperature 24 becomes 5 V*(R12//R3)/(R11+(R12//R3))=1.67 V. The above two calculations are rough calculation, so that the leakage current to the input terminal 31 is ignored. This embodiment is summarized bellow using the above example and FIG. 10. When the detected temperature is lower than the reference temperature 24, if the detected temperature becomes 3.3 V or higher, the output of the comparator 25 is changed to low and thereafter, until the detected temperature lowers to 1.8 V or lower, the output of the comparator 25 is kept low. Inversely, when the detected temperature is higher than the reference temperature 24, if the detected temperature becomes 1.8 V or lower, the output of the comparator 25 is changed to high and thereafter, until the detected temperature rises to 3.3 V or higher, the output of the comparator 25 is kept high. The temperature hysteresis width in this case is 1.66 V around 2.5 V and the temperature for outputting a high and a low signal can be set separately. In the above embodiment, the respective resistances are fixed, though the hysteresis width can be changed depending on a combination thereof. According to this embodiment, the operation hunting state of the throttle valve 3 due to the detected temperature can be avoided.

According to the fifth embodiment, as described above, when the temperature hysteresis is given in the first to fourth embodiments and the temperature of the throttle device 1 varies across the reference temperature, the hunting operation state of the throttle device 1 is prevented and the safety of a car can be improved.

The sixth embodiment will be explained by referring to FIG. 4. The highest operation guarantee temperatures of the semiconductors in the throttle control unit are set as follows: 125° C. for the relay 12, 110° C. for the CPU 13, 100° C. for the power source IC 14, and 90° C. for the driver 15. When the highest operation guarantee temperature of the driver 15 is set to 90° C., if the temperature of the driver 15 reaches 100° C., the operation guarantee for the driver 15 is not realized. Namely, the semiconductors used in the aforementioned car control unit are respectively different in the operation guarantee temperature, so that the reference temperature cannot be set unconditionally to 125° C. and if it is set to 125° C., there are possibilities that all the units other than the relay 12 may be malfunctioned. Therefore, when the reference temperature is set to 90° C. using the above example, the relay 12, the CPU 13, the power source IC 14, and the driver 15 are stopped, so that the throttle control unit 10 can be stopped free of malfunctions. Further, as described in the fourth embodiment, when the reference temperature is set to 90° C. in the same way as with the aforementioned, the units other than the driver 15 can operate and the CPU 13 can continue the malfunction monitoring for the driver 15 and other processes.

According to the sixth embodiment, the lowest semiconductor operation guarantee temperature of the throttle control unit is set, thus even if the internal temperature of the throttle control unit 10 becomes higher than the reference temperature, malfunctions can be conditionally controlled to the lowest limit.

The seventh embodiment will be explained by referring to the sixth embodiment. The reference temperature in the sixth embodiment is set to the highest operation guarantee temperature 90° C. of the driver 15. However, when the temperature detection unit is arranged in a location away from the driver 15, for example, when the driver 15 is arranged at the right end of a substrate with a thickness of 100 mm and the temperature detection unit is arranged at the left end of the substrate, the temperature of a temperature detection object cannot be detected. Namely, for example, when the driver 15 is at 50° C. and the temperature of the driver 15 rises up to 100° C. immediately after it, the temperature detection unit arranged at the left end of the substrate cannot detect the temperature rise immediately, and as a result, since the temperature of the driver is 100° C., the operation of the driver 15 cannot be guaranteed. Therefore, to solve the above problem, the temperature detection unit is arranged within a fixed distance from the temperature detection object, that is, the driver 15 in the above example, thus the temperature detection unit can detect sudden temperature changes and furthermore malfunctions can be prevented. With respect to the fixed distance mentioned above, for example, from the manufacture conditions of the aforementioned car control unit, that is, when parts are loaded on the substrate, if the intervals between loaded parts are narrow, the parts cannot be loaded, so that the distance is set to 1 mm or longer and to enable to detect the aforementioned sudden temperature changes, the distance is set to 5 mm or shorter.

According to the seventh embodiment, the temperature detection unit is arranged at a fixed distance from the temperature detection object, thus the temperature detection unit can respond to sudden temperature changes of the temperature detection object, even when the temperature exceeds the operation guarantee temperature due to sudden temperature changes, stops the operation of the temperature detection object immediately, and can prevent malfunctions.

Figure 11:
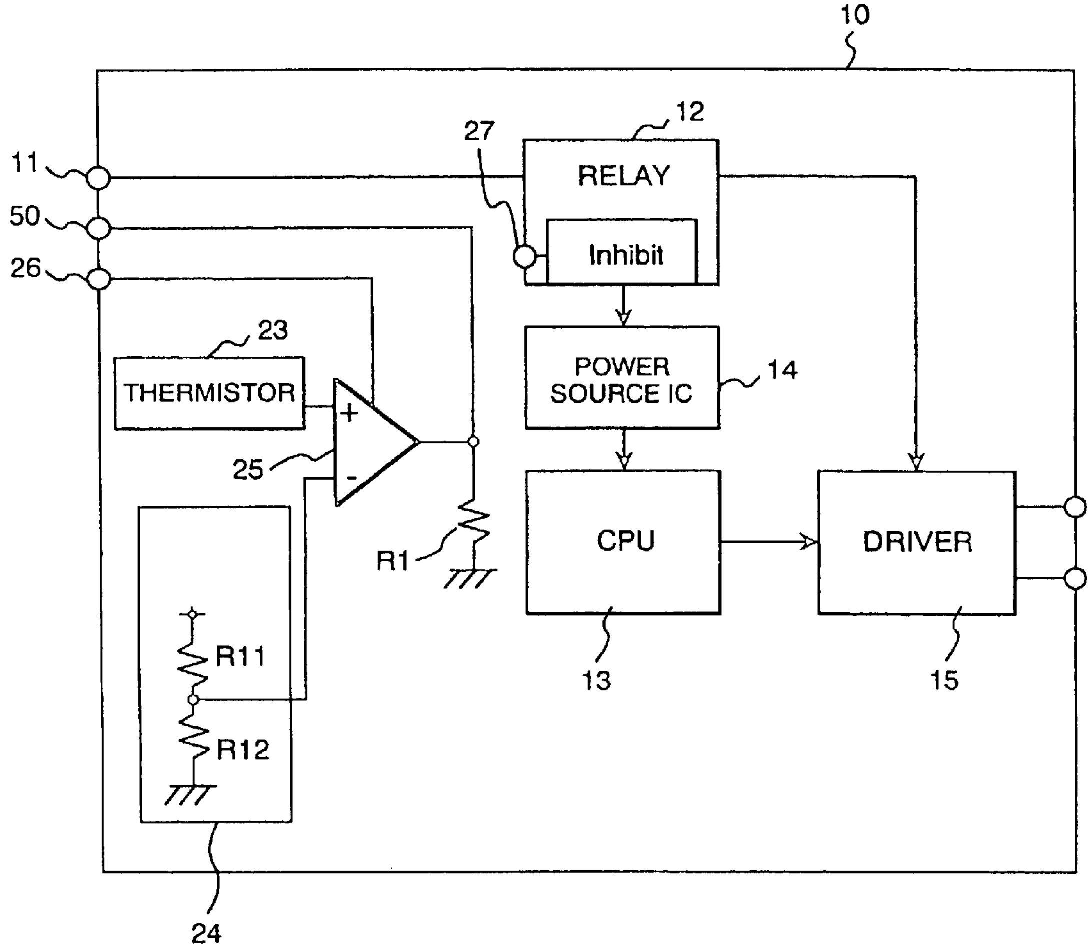
FIG. 11 is a block diagram of the throttle control unit.

Next, the eight embodiment will be explained by referring to FIG. 11. The eighth embodiment, in place of the reference temperature of the first embodiment, arranges an external output terminal 50 of the temperature detection unit in the throttle control unit 10 and inputs data to an external another car control unit, for example, the engine control unit 22 using this terminal. For example, when the inner temperature of the throttle control unit 10 is higher than the reference temperature, the throttle control unit 10 enters the non-operation state. In this state, the engine control unit 22 can recognize that the throttle control unit is stopped, though the engine control unit cannot discriminate whether the throttle control unit is stopped due to a fault or it is stopped because the inner temperature of the throttle control unit is high. Therefore, the aforementioned external output terminal 50 is arranged, and the detected temperature inside the throttle control unit 10 is input to the engine control unit 22, thus the operation stop of the throttle control unit 10 can be discriminated, and the engine control unit can send out a warning of the car control unit being overheated on the display of the car.

According to the eighth embodiment, when the throttle control unit 10 is stopped as a result of the comparator, the engine control unit 22 can recognize it, can discriminate operation stop due to a fault from operation stop due to an abnormal rise in the inner temperature of the throttle control unit, and can send out a warning of overheating on the display of the car.

In the explanation of the first to eighth embodiments, the throttle control unit 10 and the throttle body 2 are integral with each other. However, the embodiments may be applied to a constitution that the throttle control unit 10 and the throttle body 2 are separate from each other, that is, a constitution that the throttle body 2 is attached to the intake pipe 17 of the engine 16 and the throttle control unit 10 is installed in a far location such as a car room. Further, in the explanation of the first to eighth embodiments, the throttle control unit 10 is used. However, in addition to the throttle control unit 10, the embodiments may be applied to, for example, a control unit for an automatic speed regulator or a control unit for a switching device of two-wheel drive and four-wheel drive.

Figure 12:
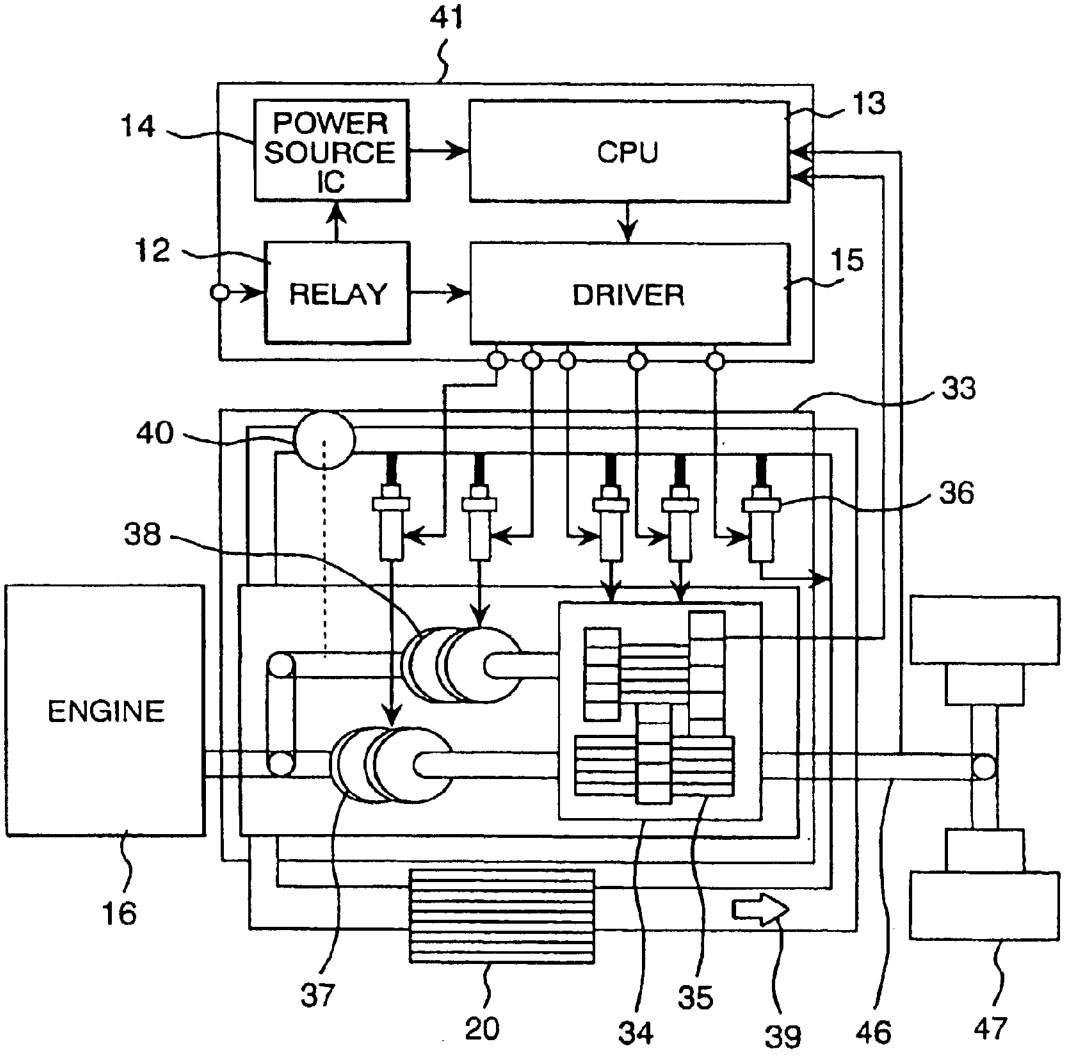
FIG. 12 is a block diagram of the eighth throttle control unit of this embodiment.

Next, a control unit for an automatic speed regulator relating to the ninth embodiment will be explained by referring to FIG. 12. In a speed regulator 34 of an automatic speed regulator 33, a speed change gear 35 for changing the speed of the output from the engine 16, a solenoid 36 for switching the speed change gear, a clutch 37 for transferring and interrupting the power, and a torque converter 38 are arranged and additionally an oil pump 40 for circulating mission oil 39, a car speed sensor, a rotation sensor, and a throttle sensor are arranged. The solenoid 36 is composed of a line solenoid for making the oil pressure of the oil pump 40 constant, a lockup solenoid, a torque converter solenoid, and gear solenoids that, for example, in an automatic four-speed regulator, when switching the speed regulator to the first speed, the two gear switching solenoids are turned ON and ON, when switching to the second speed, turned ON and OFF, when switching to the third speed, turned OFF and OFF, and when switching to the fourth speed, turned OFF and ON. In an automatic speed change control unit 41, a control CPU, the driver 15 for driving the solenoids, and the power source IC 14 for supplying power to the CPU 13 are arranged. In this case, when the automatic speed change control unit fails, the driver 15 for driving the solenoids does not operate, so that the gear solenoids are turned OFF and OFF and the speed regulator is structured so as to be fixed to the third speed.

When the engine 16 is in operation when a car is stopped, the engine power is transmitted to the torque converter 38 and the mission oil rises in temperature due to friction with the torque converter 38. Further, when the car is running, the mission oil rises in temperature due to friction between the speed change gear 35 and the mission oil 39. Generally, when the mission oil reaches 120° C. or higher, it changes in quality and a fault is caused to the automatic speed regulator due to insufficient lubrication of the mission, so that in order to prevent the mission oil from excessively rising in temperature, the mission oil 39 is circulated and cooled in the radiator 20 by the oil pump 40. Further, the automatic speed change control unit 41 is structured integrally with the speed regulator 34, so that it is prevented from overheating by the radiator 20. Between the state that the automatic speed regulator 33 is applied with a high load causing an extreme rise in temperature, that is, the state that a car is running at high speed and the state that the oil pump 40 is stopped and the cooling effect of the automatic speed regulator 33 is lost, that is, the state, that the car is stopped and keyed off and the engine 16 is stopped, heat generated by friction between the mission oil 39 and the speed change gear 35 or the torque converter 38 is not radiated and the temperature of the engine rises after stopping in the same way as with the throttle device 1, so that the temperature of the mission oil reaches 140° C., thus the automatic speed change control unit 41 also rises to 140° C. and then is naturally cooled. When the automatic speed change control unit 41 is operated in this state, the atmospheric temperature of the control unit rises to 140° C., so that the temperature of the semiconductor device arranged in the control unit, in the same way as with the case that the highest operation guarantee temperature of the semiconductor is 125° C., becomes beyond the semiconductor operation guarantee temperature range and the operation of the automatic speed regulator 33 cannot be guaranteed.

Figure 13:
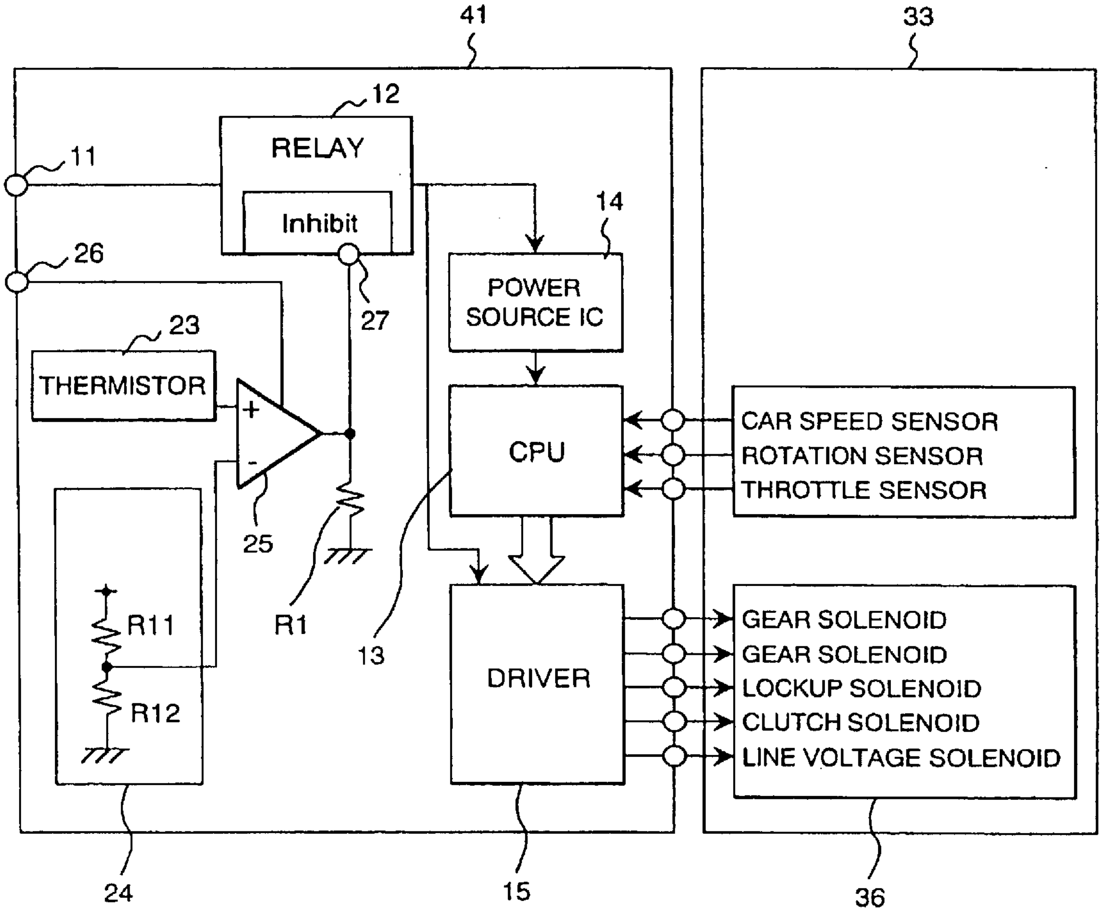
FIG. 13 is a block diagram of a conventional car drive system and automatic speed regulator.

As an embodiment for solving the above problem, the automatic speed change control unit 41 to which the first embodiment of the throttle control unit is applied will be explained below by referring to FIG. 13. In the same way as with the first embodiment, when the detected temperature of the automatic speed change control unit 41 is lower than the reference temperature 24, as a comparison result of the comparator 25, the relay 12 enters the operation state. Inversely, when the detected temperature is higher than the reference temperature 24, as a comparison result of the comparator 25, the relay 12 enters the non-operation state, and furthermore no power is supplied, and the CPU 13 and the power IC 14 enter the non-operation state. Needless to say, the driver output is turned OFF and the automatic speed change control unit 41 can be prevented from malfunctions. Furthermore, the aforementioned two gear solenoids are turned OFF and OFF, and the automatic speed regulator 33 is fixed to the third speed, and the can run with the third speed fixed at worst. According to this embodiment, the same effects as those of the first embodiment used by the throttle device 1 can be obtained. Similarly, the second to fifth embodiments applied by the throttle device 1 obtain the same effects and in the sixth embodiment, the automatic speed change control unit 41 is structured integrally with the speed regulator 34, though the automatic speed change control unit 41 may be structured separately from the speed regulator.

According to the ninth embodiment, as described above, in the control unit of the automatic speed regulator 33 applying the first embodiment, when the temperature of a semiconductor installed in the automatic speed change control unit 41 is beyond the operation guarantee temperature range of the semiconductor, the main power source of the automatic speed change control unit 41 is interrupted, and the automatic speed change control unit 41 is prevented from malfunctions, thus the safety of a car can be improved. Further, in the same way as with the aforementioned throttle device, the same effects as those of the second to eighth embodiments can be obtained.

Figure 14:
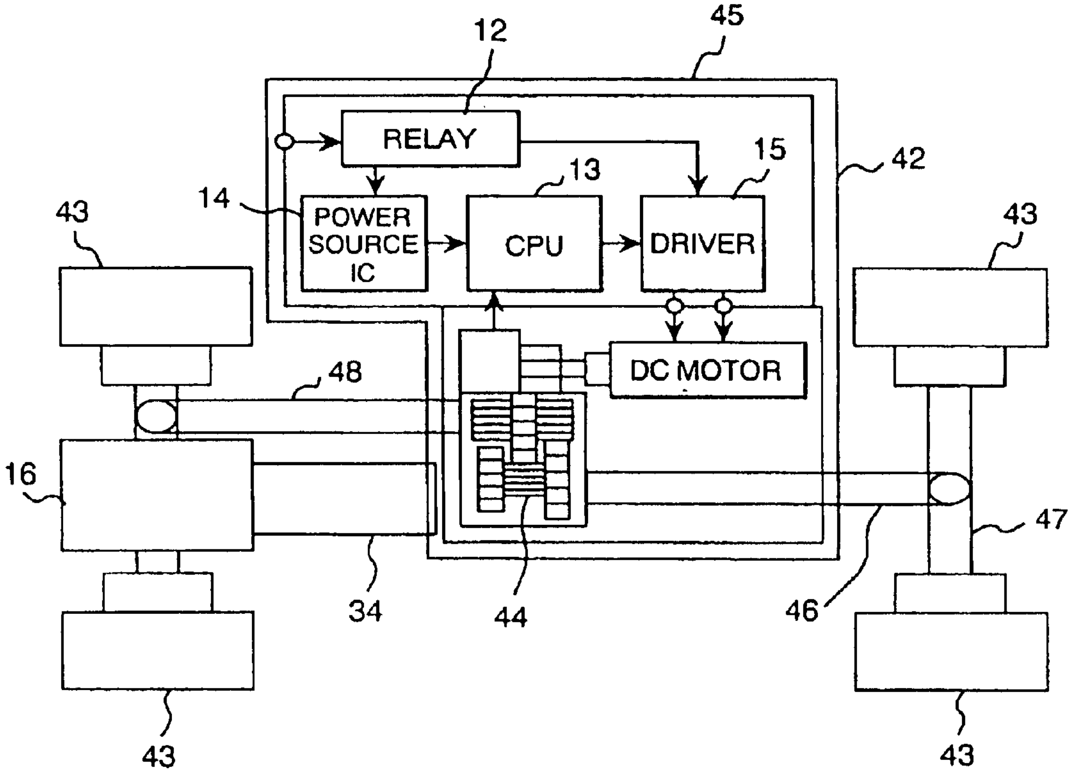
FIG. 14 is a block diagram of the sixth automatic speed regulator of this embodiment.

Next, a two-wheel drive and four-wheel drive switching device 42 (hereinafter, referred to as an ITM device) for switching two-wheel drive and four-wheel drive relating to the tenth embodiment will be explained below by referring to FIGS. 14 and 15. This embodiment will be explained using a constitution of transmitting the output of the speed regulator 34 to front and rear wheels 43 of a car. In a two-wheel drive and four-wheel drive switching mechanism 44 of the ITM device 42, a mechanism for switching the output of the engine 16 and the speed regulator 34 to the wheels 43 of the car and for example, a motor 4 for operating the mechanism which is a mechanism composed of, for example, a gear or a chain are installed and additionally, gear oil for lubricating the two-wheel drive and four-wheel drive switching mechanism 44 is included. Further, an ITM control unit 45 for controlling the ITM device 42 is structured so as to be arranged directly on or in the neighborhood of the ITM device 42 and includes the control CPU 13, the power source IC 14 for supplying power to the CPU, and additionally the driver 15 for driving the motor. The output of the engine 16 is reduced in speed by the speed regulator 34 and transmitted to the wheels 43 via drive shafts 46 and 47, and the two-wheel drive and four-wheel drive switching mechanism 44 is controlled according to the state of a road surface, and the drive wheels of the car are switched from the two-wheel drive to the four-wheel drive via drive shafts 48 and 49. Further, although the non-operation state is a worst condition, the ITM device cannot switch the two-wheel drive and four-wheel drive. However, the car can run by either of the two-wheel drive and four-wheel drive.

In this embodiment, in the same way as with the sixth embodiment, when the temperature of the ITM device 42 is rising, for example, when a car is running at high speed, the gear oil in the ITM device rises in temperature due to friction with the gear in the two-wheel and four-wheel switching mechanism. However, the car is always running, so that the gear oil is stirred, thus the gear oil is prevented from abnormally rising in temperature. However, when the car is stopped immediately after running at high speed, the gear oil is not stirred, thus the temperature of the gear oil rises up to 140° C. in the same way as with the automatic speed regulator, and when the two-wheel drive and the four-wheel drive are switched in this state, the atmospheric temperature of the control unit rises to 140° C., and the temperature of the semiconductor device arranged in the control unit, in the same way as with the case that the highest operation guarantee temperature of the semiconductor is set at 125° C., becomes beyond the semiconductor operation guarantee temperature range, and the operation of the ITH device 42 cannot be guaranteed.

When the first embodiment is applied as an embodiment for solving the above problem, in the same way as with the sixth embodiment, the ITM device 42 enters the non-operation state and the car drive wheels cannot be switched between the two-wheel drive and the four-wheel drive. However, as described previously, the car can run, so that the gear oil in the ITM device is stirred, and the temperature of the ITM device 42 lowers, and the ITM device 42 can be returned again. Namely, when the temperature of the ITM device 42 is abnormal, the ITM device 42 is put into the non-operation state, thus the ITM device 42 can be prevented from malfunctions. In the same way as with the automatic speed regulator 33, even when the second to fifth embodiments are applied, the same effects can be obtained. Further, in the description of this embodiment, the ITM control unit 45 is arranged directly on the ITM device 42. However, even when the ITM control unit 45 is arranged separately from the ITM device 42, the same effects can be obtained.

According to the tenth embodiment, in the same way as with the throttle device 1 and the automatic speed regulator 33, the two-wheel drive and four-wheel drive switching device 42 is prevented from malfunctions, thus the safety of a car can be improved.

Further, in the first to tenth embodiments, the throttle device 1, the automatic speed regulator 33, and the two-wheel drive and four-wheel drive switching device 42 are described. However, even when the embodiments are applied to other car control units, the same effects can be obtained.

According to the present invention, even if errors due to the operation environment of control units installed in a car occur, malfunctions are prevented, thus the safety of the car can be improved. Further, malfunctions, if any, can be suppressed to the minimum limit.

What is claimed is:

1. A car control unit comprising a semiconductor, an internal temperature detection unit for detecting an internal temperature of said car control unit, a comparison output unit for comparing an internal temperature value concerning said detected internal temperature with a reference value of temperature concerning a temperature at which said semiconductor operates and outputting a signal when said internal temperature value is higher than said reference value of temperature, and a controller for controlling a main power source of said car control unit so as to maintain safe running of said car according to said output signal.

2. A car control unit according to claim 1, wherein said car control unit has a relay and controls said relay by output of said comparison output unit.

3. A car control unit according to claim 1, wherein said car control unit has a power source for supplying power to a microcomputer and controls said power source by output of said comparison output unit.

4. A car control unit according to claim 1, wherein said car control unit has a microcomputer and a reset unit for stopping an internal operation of said microcomputer and controls said reset unit by output of said comparison output unit.

5. A car control unit according to claim 1, wherein said car control unit has a drive unit for operating an actuator and controls said drive unit by output of said comparison output unit.

6. A car control unit according to claim 1, wherein said internal temperature of said car control unit to be output from said comparison unit is different from said internal temperature of said car control unit not to be output from said comparison unit.

7. A car control unit comprising a semiconductor, an internal temperature detection unit for detecting an internal temperature of said car control unit, a comparison output unit for comparing an internal temperature value concerning said detected internal temperature with a reference value of temperature concerning a temperature at which said semiconductor operates and outputting a signal when said internal temperature value is higher than said reference value of temperature, and a controller for controlling said car control unit so as to maintain safe running of said car according to said output signal, wherein said reference value of temperature is set so that a highest operation guarantee temperature preset in said car control unit is a lowest operation guarantee temperature of said semiconductor.

8. A car control unit comprising a semiconductor, an internal temperature detection unit for detecting an internal temperature of said car control unit, a comparison output unit for comparing an internal temperature value concerning said detected internal temperature with a reference value of temperature concerning a temperature at which said semiconductor operates and outputting a signal when said internal temperature value is higher than said reference value of temperature, and a controller for controlling said car control unit so as to maintain safe running of said car according to said output signal, wherein said car control unit has a semiconductor as said temperature detection unit and said semiconductor is arranged on a substrate of said car control unit at a fixed distance from an object for which said reference value of temperature is set so that a highest operation guarantee temperature set in said car control unit is a lowest operation guarantee temperature of said semiconductor.

9. A car control unit according to claim 1, wherein said reference value of temperature is set by a resistor.

10. A car control unit according to claim 1, wherein said reference value of temperature is input from the outside of said car control unit.

11. A throttle control unit comprising an internal temperature detection unit for detecting an internal temperature of said throttle control unit having a semiconductor, a comparison output unit for comparing an internal temperature value concerning said detected internal temperature with a reference value of temperature concerning a temperature at which said semiconductor operates and outputting a signal when said internal temperature value is higher than said reference value of temperature, and a controller for controlling a main power source of said throttle control unit so as to maintain safe running of said car according to said output signal, wherein said throttle control unit has a mechanism that a throttle valve for changing an air flow rate is controlled to open and close by a motor and when said motor is put into a non-operation state, said throttle valve is mechanically opened at a fixed aperture.

12. An automatic speed change control unit for controlling an automatic speed regulator, comprising a semiconductor, an internal temperature detection unit for detecting an internal temperature of said automatic speed change control unit, a comparison output unit for comparing an internal temperature value concerning said detected internal temperature with a reference value of temperature concerning a temperature at which said semiconductor operates and outputting a signal when said internal temperature value is higher than said reference value of temperature, and a controller for controlling a main power source of said automatic speed change control unit so as to maintain safe running of said car according to said output signal, wherein said automatic speed change control unit is controlled by a solenoid for changing the speed of a speed regulator and when said solenoid is put into a non-operation state, said automatic speed regulator is set to the fixed speed.

13. A car control unit according to claim 1, wherein said car control unit is a two-wheel drive and four-wheel drive switching control unit and has a mechanism for controlling switching of two-wheel drive and four-wheel drive of a car by a motor and when said motor enters a non-operation state, fixing said switching mechanism to two-wheel drive or four-wheel drive.

* * * * *